Nov. 22, 1938.  C. F. RUBSAM  2,137,416

COUNTERBALANCING MEANS FOR AUTOMOBILE WHEELS

Filed Dec. 19, 1935  2 Sheets-Sheet 1

INVENTOR.
CHARLES F. RUBSAM
BY
ATTORNEY.

Nov. 22, 1938.   C. F. RUBSAM   2,137,416
COUNTERBALANCING MEANS FOR AUTOMOBILE WHEELS
Filed Dec. 19, 1935   2 Sheets-Sheet 2

INVENTOR.
CHARLES F. RUBSAM
BY
ATTORNEY.

Patented Nov. 22, 1938

2,137,416

UNITED STATES PATENT OFFICE 2,137,416

COUNTERBALANCING MEANS FOR AUTOMOBILE WHEELS

Charles F. Rubsam, Jackson, Mich.

Application December 19, 1935, Serial No. 55,236

8 Claims. (Cl. 301—5)

This invention relates to a means for securing a counterbalance weight to the rim of an automobile wheel, which is an improvement on the device disclosed in my pending application Serial No. 757,542, filed December 14, 1934.

An object of the invention lies in the provision of an inexpensive device adapted for removable attachment to the rim flange of any automobile wheel and designed to prevent inadvertent dislodgment therefrom.

Frequently irregularities within an automobile wheel, and particularly within the tire itself, cause an eccentric weight which requires the wheel to be balanced after the tire has been mounted on the rim.

Specific forms of the present invention are designed so that the counterweights may be partially retained on the rim flange by pressure exerted either directly or indirectly by the inflation of the tire, or by other means hereafter described. These counterweights may be applied either to the flange of a split type rim or of any other standard rim.

Another specific object of the invention lies in the provision of a detachable counterweight which may be conveniently applied to the drop center rims such as shown and described in my aforesaid pending application.

A more specific object resides in the provision of a clip adapted to resiliently grip the underside of the overhang of the rim flange of the wheel to prevent inadvertent dislodgment therefrom, and also to hold a counterweight out of contact with the substantially radially directed portion of the rim flange so that said resilient grip by the clip is not interfered with.

Another object of the invention is to provide a counterbalance for automobile wheels which may be easily and quickly removed or replaced by the use of any standard tool, such as a hammer, screw-driver, or a pair of pliers.

Further objects include so arranging such devices as to permit freedom of movement after application and before inflation of the tire, so that the weights may be slid circumferentially to the proper location, securing the correct balance, and then be held either by the pressure exerted upon inflation of the tire, or by the resilient grip of the clip beneath the overhanging portion of the rim flange, or by both.

Other and further objects may be apparent from the consideration of the following specification written in conjunction with the accompanying drawings, in which:—

Figure 1:
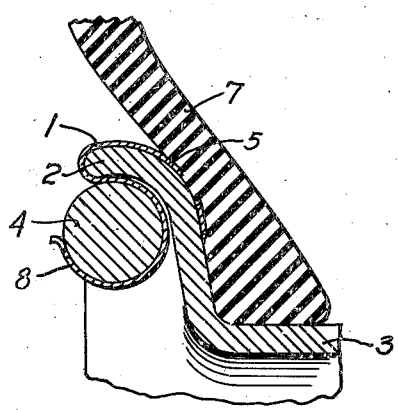
Fig. 1 is a fragmentary sectional view showing a spring clip and weight in position on a rim flange.

Figs. 4, 5, 6, 8, 11, 12, and 13 are fragmentary sectional views showing modifications of the clip construction shown in Fig. 1.

Figure 6:
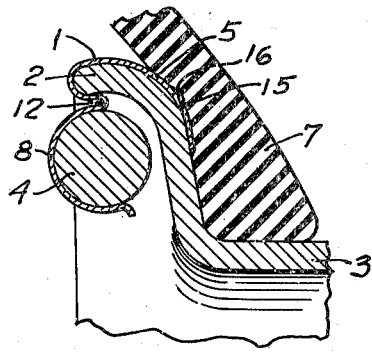
Figure 7:
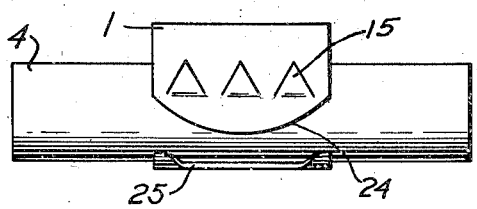

Fig. 7 is a side elevation of the clip shown in Fig. 6.

Figure 8:
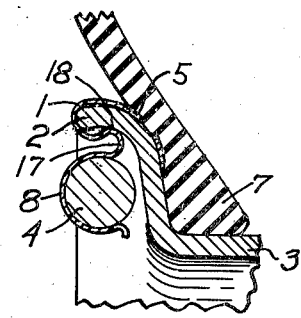
Figure 9:
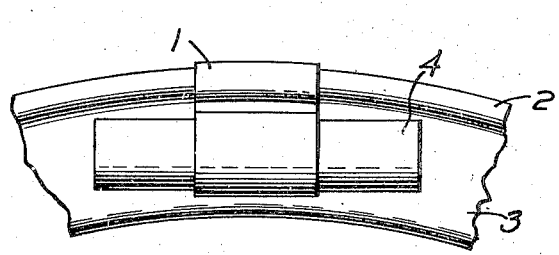

Fig. 9 is a side elevation of the construction shown in Fig. 8.

Figure 10:
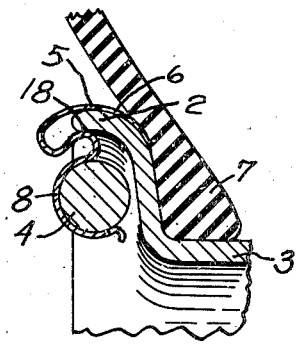

Fig. 10 is a fragmentary sectional view showing how the clip and counterweight may be applied to the rim.

Referring to Fig. 1 in the drawings, the clip indicated at 1 is shown applied to the flange 2 of a wheel rim 3 which is adapted to hold a counterweight as at 4. The clip is preferably made of spring steel. The portion 5 lying on the inner face of the flange 2 contacts the surface of the rim flange under the pressure of the portion 5 exerted by the inflated tire.

The portion 5 has provided therein an opening or an aperture as at 6 through which a portion of the tire casing 7 may expand into and eventually contact a corresponding portion of the inner face of the flange 2. Inflation of the tire and consequent bulging of a portion of the casing in the aperture 6 locks or retains the clip in a fixed position on the flange.

The portion 8 of the clip 1 which serves to retain the counterweight 4 is formed on a radius of curvature slightly less than that of the counterweight so that when the counterweight is placed in the clip, the spring tension in the portion 8 tightly grips the surface of the counterweight 4.

It will be noted that the portion 8 contacts the counterweight over a distance greater than half the circumference of the counterweight to insure inadvertent dislodgment of the counterweight from the clip.

The counterweight 4 is preferably located beneath the overhanging portion of the rim flange 2.

Figure 4:
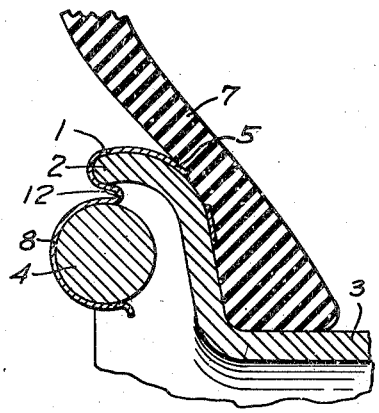
Figure 2:
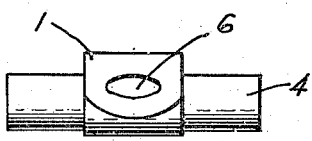
Fig. 2 is a side elevation of the clip and weight.
Figure 3:
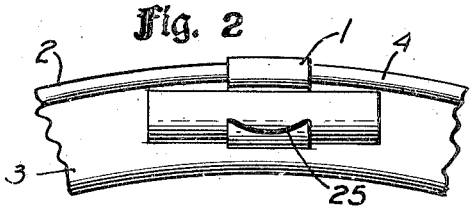
Fig. 3 is a side elevation of the clip as applied to the rim.

In Fig. 4 the portion 8 of the clip 1 is shown bent around the counterweight 4 in the opposite direction from that in Fig. 1, resulting in a reverse bend as at 12 between the portion 5 and the portion 8. In this modification, the open side of the portion 8 lies toward the substantially radially directed portion of the flange 2 of the rim 3.

Figure 5:
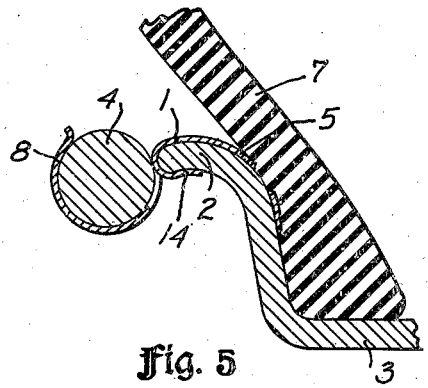

In Fig. 5 the counterweight 4 is held in an outwardly extending position from the flange 2 by the portion 8 of the clip 1. The clip is further secured to the flange 2 by a lip 14 struck from the portion 8 and embracing the end of the rim flange 2.

In Figs. 6 and 7, the shape of the clip is substantially identical with that shown in Fig. 4, but having one or more prongs 15 on the portion 5 struck outwardly in the direction of the wall of the tire so that the short edge 16 may bite into the surface of the tire casing 7. The prongs 15 are preferably struck so that the portion 5 may be easily positioned over the flange 2 while the tire is inflated and that they may hinder reverse movement thereof after the clip has been located. With this construction having the weight receiving channel or recess opening inwardly the weight may be inserted by being forced in from one side of the recess moving the weight axially as distinguished from snapping the weight into the recess of the clip by a lateral movement as is possible with the construction shown in Fig. 1.

Figs. 8 and 9 disclose a clip having the portion 5, as in Figs. 1, 4 and 5, engaging the rim flange 2 on the inner face thereof, and also a curled portion 17 embracing the outer edge of the rim flange and engaging the under side thereof in a narrow surface as at 18. Since the normal inside space between portion 5 and surface 18 is to be narrower than the thickness of rim stock of flange 2, it follows that when the clip 1 is in position as shown in Fig. 8 it is held under tension caused by the contact at 18 beneath the overhanging flange portion.

This construction accommodates, within reasonable limits, any variation in thickness or other irregularities of the rim flange. Since the clip engages the under side of the flange at the narrow surface 18, which may be a single line, the unit pressure of the clip beneath the rim flange is relatively great, and the resistance to movement of the clip either radially or circumferentially relative to the rim is correspondingly great.

If the tire should happen to be under-inflated, the intermittent motion between the wall of the casing and the flange 2 as the wheel revolves might be sufficient to cause the clip to move radially outward. This action is prevented, however, by providing the clip with a more positive engaging action as a safeguard in case of a blowout.

Fig. 10 shows generally how the clips may be applied to the rim while the tire is fully inflated. The portion 5 of the clip may be wedged between the tire and the inner face of the flange 2 as far as possible with the fingers until binding starts, when surface 18 comes into contact with the end of the rim flange. It may then be driven into place by a few light taps with a hammer.

Figure 11:
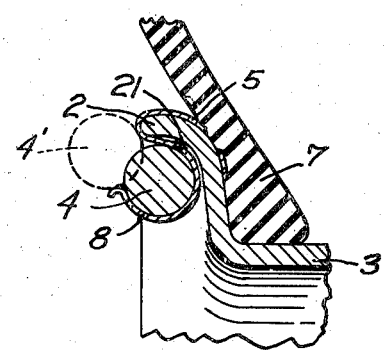

Fig. 11 shows a clip having the same general shape as that disclosed in Fig. 1 and is provided with a protuberance as at 21 formed in the portion 8. This protuberance contacts the underside of the overhang of the rim flange 2 and spaces the remainder of the portion 8 a slight distance from the substantially radially directed portion of the flange 2. The weight 4' shown in dotted lines in Fig. 11 may be snapped into the clip after the latter has been applied to flange 2.

Figure 12:
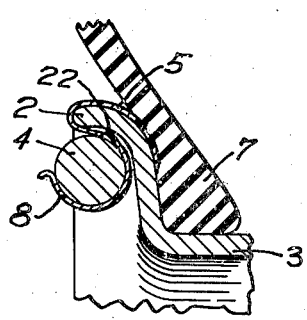

Fig. 12 is a further modification of Fig. 11, showing a rupture in the portion 8 which has a sharp exposed edge 22 adapted to gouge into the rim flange 2 and prevent inadvertent dislodgement or dislocation of the clip relative to the rim.

Figure 13:
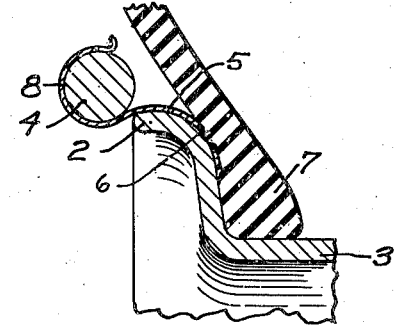
Figure 14:
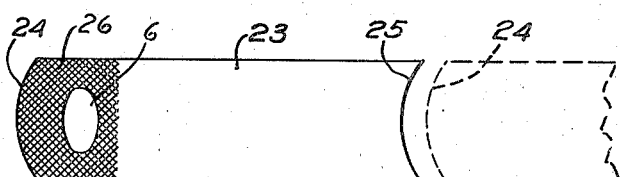

In Fig. 13 the ability of the clip to adhere to the rim depends entirely on the pressure of the tire which causes the tire casing to bulge into aperture 6 of the clip.

While applicant has shown and described several modifications of his present invention, he does not wish to be limited thereto, since it may be apparent to those skilled in the art that other modifications may be made without departing from the spirit and scope of this invention as defined in the appended claims.

Having thus described my invention, what I claim is:

1. A wheel balancing device for an automobile wheel having a rim, tire retaining flange, and a pneumatic tire, said device including a clip and a weight, said clip comprising a flange gripping portion having an aperture therethrough, and a weight gripping portion, said flange gripping portion being adapted to hold said clip on said flange and said weight gripping portion being adapted to independently secure said weight onto said clip, said aperture portion with said device applied being disposed over a portion of said flange normally engaged by the side wall of the tire.

2. A wheel balancing device for an automobile wheel having a rim, tire retaining flanges, and a pneumatic tire, comprising a clip and a counterweight, said clip including a flange engaging portion adapted to partially lie between said flange and said tire, and having an aperture through which a portion of said tire bulges to retain the clip in position and a counterweight gripping portion adapted to independently secure said counterweight to said clip.

3. A wheel balancing device for an automobile wheel having a rim and tire retaining flanges, comprising a clip and a counterweight, said clip including a flange securing portion adapted to retain said clip to said flange and a counterweight supporting portion having a projection formed thereon, said projection being adapted to contact said flange in a limited area and spacedly retain said counterweight supporting portion from said flange.

4. A wheel balancing device for an automobile wheel having a rim and tire retaining flanges, and a pneumatic tire, comprising a clip and a counterweight, said clip including a flange engaging portion adapted to partially lie between said flange and said tire, means on said flange engaging portion to interengage with the material of said tire when inflated, said means being adapted to hold said clip in position on said flange.

5. In an automobile wheel balancing device including a weight and a supporting means for said weight, said supporting means comprising a clip made of strip material and being of such a shape to provide a flange engaging portion and a weight supporting portion, the flange engaging portion having a tire material receiving aperture therein.

6. In a device for balancing automobile wheels, comprising a rim having tire retaining flanges, the combination of a weight and a weight retaining clip, said clip being made of strip material and of such a construction providing for a flange engaging portion and a weight supporting portion, said weight supporting portion being of such a construction as to hold the weight spaced from the flange.

7. A device for balancing automobile wheels in combination with an automobile wheel rim having tire retaining flanges, said device comprising a weight and a weight supporting clip, said clip including a flange embracing portion and a weight embracing portion, said flange embracing portion being adapted to act independently to retain said clip to said flange and said weight embracing portion being adapted to act independently of the flange embracing portion to support said weight, said flange and weight embracing portions defining restricted throats of less unsprung dimension than that of the parts received therein. the restricted throat of said weight embracing portion being defined by two outwardly flared edge portions to facilitate snapping of the weight into said weight embracing portion by bodily transverse movement of said weight.

8. A wheel balancing device for applying to the rim flange of an automobile wheel comprising a resilient retaining clip having a rim engaging portion, and a counterweight engaging portion, said counterweight engaging portion, with the clip engaging said rim, opening outwardly and being shaped to permit a counterweight to be snapped into place and resiliently held, and a counterweight resiliently gripped within said counterweight receiving portion.

CHARLES F. RUBSAM.